US006934564B2

(12) United States Patent
Laukkanen et al.

(10) Patent No.: US 6,934,564 B2
(45) Date of Patent: Aug. 23, 2005

(54) METHOD AND APPARATUS FOR PROVIDING HINDI INPUT TO A DEVICE USING A NUMERIC KEYPAD

(75) Inventors: Petri Laukkanen, Pirkkala (FI); Minna-Mari Savolainen, Oulu (FI)

(73) Assignee: Nokia Corporation, Espoo (FI)

( * ) Notice: Subject to any disclaimer, the term of this patent is extended or adjusted under 35 U.S.C. 154(b) by 593 days.

(21) Appl. No.: 10/027,145

(22) Filed: Dec. 20, 2001

(65) Prior Publication Data

US 2003/0119551 A1 Jun. 26, 2003

(51) Int. Cl.[7] .......................... H04M 1/00; G09G 5/00; H03K 17/94

(52) U.S. Cl. .................... 455/566; 455/550.1; 345/171; 341/28; 341/23

(58) Field of Search ....................... 379/433.04, 433.06, 379/433.07; 345/168, 169, 171; 455/566, 186.2, 550.1, 414.1, 414.2, 414.3, 456.1, 456.2, 456.3, 456.5, 456.6, 41.2; 341/22, 23, 28; 715/535, 531, 530; 400/109, 110, 111, 484; 704/1, 3, 5, 8, 9; 342/457, 463

(56) References Cited

U.S. PATENT DOCUMENTS 5,687,386 A 11/1997 Niimura ..................... 715/519
5,852,783 A * 12/1998 Tabe et al. .................. 455/566
6,007,339 A * 12/1999 Zen et al. .................. 434/157
6,356,258 B1 * 3/2002 Kato et al. .................. 345/168
6,631,501 B1 * 10/2003 Jurion et al. ................ 715/535
6,636,163 B1 * 10/2003 Hsieh .......................... 341/28
6,674,372 B1 * 1/2004 Ouyang ....................... 341/28
6,686,852 B1 * 2/2004 Guo ............................ 341/22
2003/0190181 A1 * 10/2003 Kim ........................... 400/472

FOREIGN PATENT DOCUMENTS

WO 01/38957 5/2001 ............. G06F/3/00

OTHER PUBLICATIONS

IBM Technical Disclosure Bulletin "Bidirectional Language Formatting and Positioning" vol. 34 No. 10A; Mar. 1992.

IBM Technical Disclosure Bulletin "Mechanism for Efficient Japanese Input " vol. 38 No. 12; Dec. 1995.

Indian Standard UDC 681.3; Bureau of Indian Standards, New Delhi; Dec. 1991.

* cited by examiner

*Primary Examiner*—Rafael Perez-Gutierrez
(74) *Attorney, Agent, or Firm*—Harrington & Smith, LLP

(57) ABSTRACT

A method is disclosed for operating a device having a numeric keypad to provide intelligent text input for Indian scripts, such as Hindi. In this method predetermined number keys, such as 2 and 3, are reserved for vowels. These keys produce either independent vowels or dependent vowels (matras) depending on the character preceding the text buffer insertion point. If the character preceding the insertion point is a consonant, keys 2 and 3 produce dependent vowels, in all other cases these keys produce independent vowels. If the user wishes to change the dependent vowel into an independent vowel, the user can do this by pressing a context switch key, such as *, and the dependent vowel in sequence. As a result, the vowel is inserted as an independent vowel, thereby overriding the context into which the vowel is being entered. Other number keys, in the preferred embodiment 4,5,6,7,8 and 9, are reserved for consonants. If the user presses any of these keys, a consonant is inserted into the display. If the user wishes to create a consonant cluster, the user can do this by pressing the * key and one of the consonant keys in sequence.

21 Claims, 5 Drawing Sheets

MATRAS
FIG.2
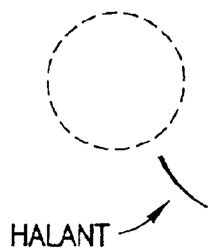
FIG.3
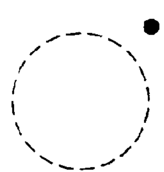
FIG.4A
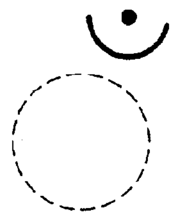
FIG.4B
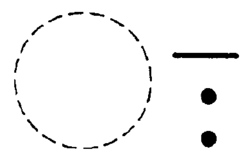
FIG.4C
FIG.5

| | |
|---|---|
| KEY 1: VOWELS | अ आ इ ई उ ऊ |
| KEY 2: VOWELS | ए ऐ ओ औ |
| KEY 1: MATRAS | ◌ा ◌ि ◌ी ◌ु ◌ू |
| KEY 2: MATRAS | ◌े ◌ै ◌ो ◌ौ |
| KEY 3: VARG 1 CONSONANTS | क ख ग घ ङ |
| KEY 4: VARG 2 CONSONANTS | च छ ज झ ञ |
| KEY 5: VARG 3 CONSONANTS | ट ठ ड ढ ण |
| KEY 6: VARG 4 CONSONANTS | त थ द ध न |
| KEY 7: VARG 5 CONSONANTS | प फ ब भ म म |
| KEY 8: NON-VARG CONSONANTS | य र ल व |
| KEY 9: NON-VARG CONSONANTS | श ष स ह |

नोकिया 3210 कॉल पंजी साथी. आपके व्यस्त
पलों में रखे ध्यान, आपकी छूटी कॉलों का.

METHOD AND APPARATUS FOR PROVIDING HINDI INPUT TO A DEVICE USING A NUMERIC KEYPAD

TECHNICAL FIELD

These teachings relate generally to user interfaces (UIs) for portable devices having limited input functionality and, more specifically, relates to mobile stations, such as cellular telephones, that have a numeric keypad, and to a technique for entering Hindi language text into the mobile station through the numeric keypad.

BACKGROUND

A problem arises when it is desired to widely distribute a mass produced device having text entry capabilities in a number of countries having different languages and writing styles and written symbols, as it is not cost-effective to modify the device to accommodate each local language and style of writing. This is particularly true for the case of mobile stations, also referred to as cellular telephones and wireless terminals, that very typically include a conventional-looking numeric keypad of the type found on touch tone telephones. Associated with the numeric keys 2, 3, 4, etc., are the characters ABC, DEF, GHI, etc, as is well known.

It is also well known to enter text using such a keypad. One technique relies on multiple depressions of a certain key to scroll through a limited set of letters, those displayed on the key, and to select a particular letter for entry when the key depressions terminate. For example, after entering an alphanumeric text mode of operation depressing the numeric key 2 one time displays the letter A, depressing the numeric key again displays a B, depressing it again displays a C, depressing it again displays the associated number 2, and depressing it again once more displays the letter A (the scrolling wraps around to the start of the sequence). Pausing after a depression for some period of time, such as for about a second, causes the currently displayed character to be entered onto a text stream being composed by the user. The zero 0 key can be used to enter a space between letters, numbers and words.

While well suited for use with those languages that employ the Latin alphabet, this conventional technique can prove to be limiting when attempting to enter other types of alphabetic symbols associated with other languages, which can have more complex rules relating to the relationships between the constituent parts of the written language, such as vowels, consonants and special characters and modifiers. Hindi is one such language.

As such, to enter a language such as Hindi a significant problem arises when one desires to employ a device capable of text entry, such as a cellular telephone, that is provided only with a simple 12 key numeric-type of keypad.

ISCII (IS 13194:1991 Indian Script Code for Information Interchange) specifies an alphabetic code that can be used for encoding multiple Indian national languages with a single codeset. ISCII has been used as the basis for the Indian script code point allocation in Unicode (Devanagari, in particular, is allocated in U+0900-U+097F in Unicode). In its annex D, the standard specifies an INSCRIPT keyboard for a PC environment.

INSCRIPT specifies a phonetic PC keyboard for Indian languages. Similarly to the general design of ISCII, the INSCRIPT keyboard is designed to work as a solution for multiple Indian languages. It provides a phonetic mapping of the keyboard that is readily usable across the Indian languages, even though they use distinct scripts for the writing of the language.

The words of the Indian language are typed in and stored in the strict phonetic order, even if the phonetic order may not always correspond to the visual appearance of the displayed text.

The INSCRIPT keyboard requires two distinct keys for each pair of independent and dependent vowels. The INSCRIPT also requires the explicit use of virama (vowel killer) to produce consonant clusters. As maybe appreciated, this approach does not lend itself for implementation on a limited keypad type of user input device, such as an ITU-T keypad of a type that is typically found in a cellular telephone.

SUMMARY OF THE PREFERRED EMBODIMENTS

The foregoing and other problems are overcome, and other advantages are realized, in accordance with the presently preferred embodiments of these teachings.

As was stated, the INSCRIPT keyboard requires two distinct keys for each pair of independent and dependent vowel, whereas this invention requires only one key for such pair. The distinction between independent and dependent vowels is either made automatically (intelligence based on the current editing context), or it is made explicitly by using a predetermined context shift key.

As was also noted above, the INSCRIPT approach requires the explicit use of virama (vowel killer) to produce consonant clusters, whereas the invention hides the use of virama from the user, and consonants are combined into clusters by using the context shift key. In practice, the user simply types in the text using a procedure similar to the multi-tapping that is widely used for entering Latin/Cyrillic/Greek/Arabic/Hebrew scripts. In most cases the user can rely on the default behavior of an editor function to make the proper choices, and when it becomes necessary to override the default behavior the user simply depresses the context shift key.

A method is disclosed for operating a device having a numeric keypad to provide intelligent text input for characters. While described below in the context of Hindi (Devanagari script), these teachings can be used as well for other Indian scripts, including Punjabi, Gujarati, Oriya, Bengali, Assamese, Telugu, Kannada, Malayalam and Tamil.

In this invention the keypad keys are redefined to be vowel keys, consonant keys, and one or more other keys, such as a context switch key. As but one non-limiting example, in this method predetermined number keys, such as 1 and 2 (or 2 and 3), are reserved for vowels. Depressing a vowel key inserts either an independent vowel or a dependent vowel (matra) in a text buffer, depending on the character preceding the current character insertion point. If the character preceding the insertion point is a consonant (of the relevant script being edited), depressing a vowel key produces a dependent vowel, in all other cases depressing a vowel key produces an independent vowel. Note in this regard that when inputting Hindi, if the insertion point happens to be preceded by a consonant from a language or script other than Hindi, e.g., the insertion point is preceded by a Latin (English) consonant "n", pressing a vowel key produces an independent vowel rather than a dependent vowel, as the preceding character is not a consonant of the relevant script (Hindi/Devanagari).

If the user wishes to change the dependent vowel into an independent vowel, the user can do this by pressing the context switch key, which may be the * key, and the vowel key in sequence. As a result, the vowel is inserted into the text buffer as an independent vowel, thereby overriding the context into which the vowel is being entered.

As but one further non-limiting example, in this method predetermined number keys, such as 3,4,5,6,7,8 and 9 (or 4, 5, 6, 7, 8 and 9), are reserved for the consonants. If the user presses any of the consonant keys, a consonant is inserted into the text buffer and displayed.

The user may enter a consonant cluster by activating the context shift key to change a previously entered consonant into a half-form, and then entering a second consonant. A nukta consonant can be entered by entering a consonant, followed by selecting a nukta modifier.

In accordance with this invention all of the alphabetic characters of an Indian script are mapped to the numeric keypad of a mobile telephone. For example, in accordance with an embodiment suitable for entering Hindi characters the mapping of the numeric keypad is as follows: key 0 is a space key; key 1 has modifiers mapped to it; keys 2–3 have vowels mapped to them; and keys 4–9 have consonants mapped to them. Other script-specific characters, such as punctuation, can be accessed from a special character list that may be accessed in any one of a number of suitable ways. In addition to the numeric keys of the numeric keypad, the input method designed for the input of Indian languages includes a context shift key, preferably but not necessarily mapped to the key * of the ITU-T keypad.

The vowel keys 2–3 have a dual function: depending on the current editing context they either produce independent vowels (Unicode reference U+0905-U+0914) or matras, i.e., dependent vowels (Unicode reference U+093E-U+094C). The default operation can be overridden by pressing the context shift key prior to pressing a vowel key.

The consonant keys 4–9 normally produce live or full consonants. The default operation can be overridden by pressing the context shift key prior to pressing a consonant key.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 2 shows Hindi character matras, or dependent vowels;

FIG. 3 shows a halant;

FIGS. 4A, 4B and 4C show modifiers, specifically a candrabindu, inserted above a character (FIG. 4A), an anusvara, inserted above a character (FIG. 4B), and a visarga, inserted beside a character (FIG. 4C);

FIG. 5 shows a nukta, that functions as a combining mark;

DETAILED DESCRIPTION OF THE PREFERRED EMBODIMENTS

Figure 1:
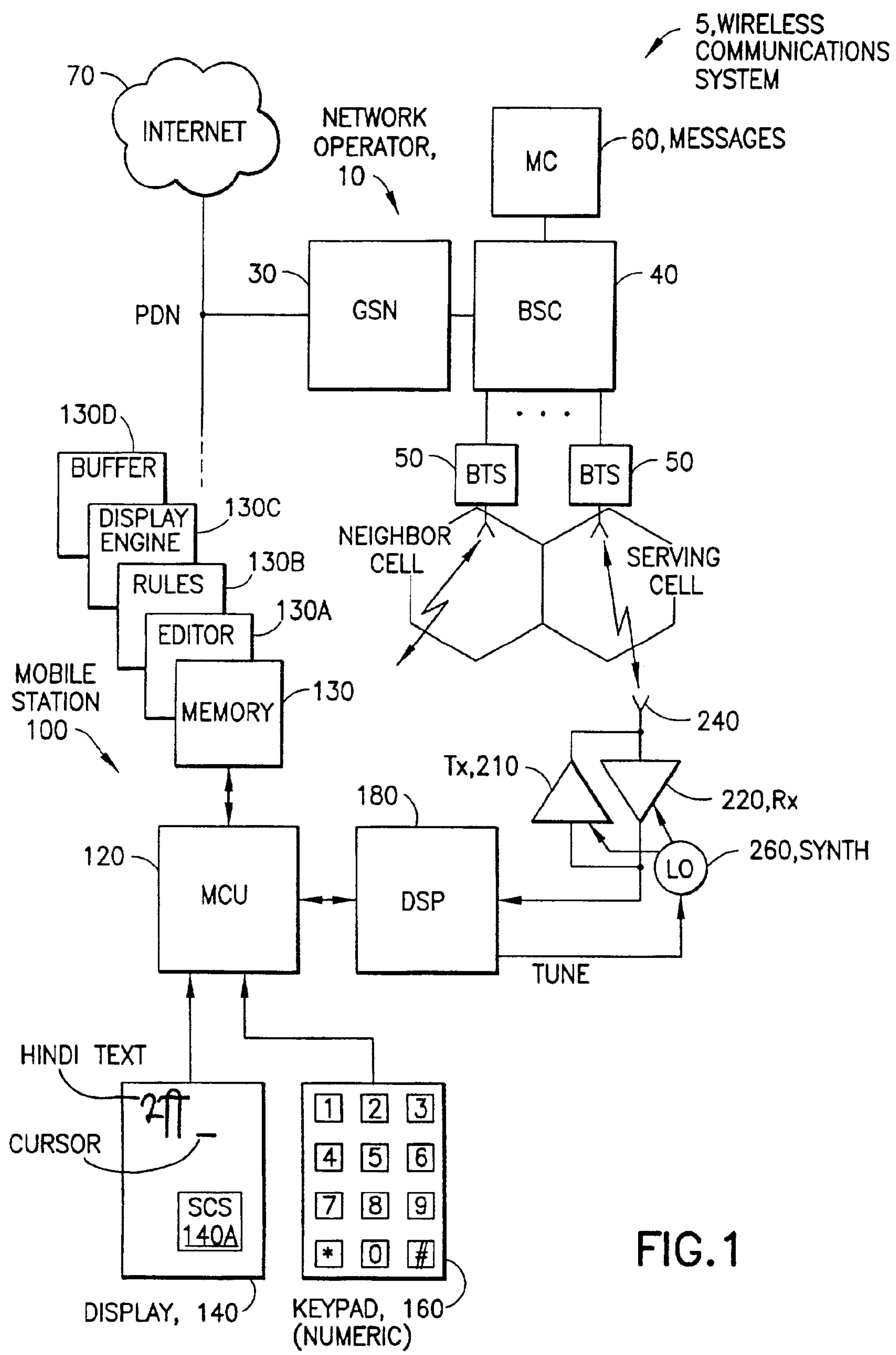
FIG. 1 is block diagram of a mobile station having a numeric keypad that is suitably programmed for implementing the teachings of this invention.

Referring first to FIG. 1, there is illustrated a simplified block diagram of an embodiment of a wireless communications system 5 that includes at least one mobile station (MS) 100 suitable for practicing this invention. FIG. 1 also shows an exemplary network operator 10 having, for example, a GPRS Support Node (GSN) 30 for connecting to a telecommunications network, such as a Public Packet Data Network or PDN, at least one base station controller (BSC) 40, and a plurality of base transceiver stations (BTS) 50 that transmit in a forward or downlink direction both physical and logical channels to the mobile station 100 in accordance with a predetermined air interface standard. A reverse or uplink communication path also exists from the mobile a station 100 to the network operator, which conveys mobile originated access requests and traffic.

The air interface standard can conform to any suitable standard or protocol, and may enable both voice and data traffic, such as data traffic enabling Internet 70 access and web page downloads. The air interface standard could be a Time Division Multiple Access (TDMA) air interface that supports a GSM or an advanced GSM protocol and air interface, or it could be a Code Division Multiple Access (CDMA) air interface, including a wideband CDMA (WCDMA) air interface. In some embodiments the air interface could as well be one similar to or based on a conventional analog air interface, such as one known in North America as AMPS, if there is some utility to be derived from the user entering text into the mobile station 100.

The network operator may also include a suitable type of Message Center (MC) 60 that receives and forwards messages for the mobile stations 100. Other types of messaging service may include Supplementary Data Services and one under currently development and known as Multimedia Messaging Service (MMS), wherein image messages, video messages, audio messages, text messages, executables and the like, and combinations thereof, can be transferred between the network and the mobile station 100.

The mobile station 100 may be a handheld radiotelephone, such as a cellular telephone or a personal communicator, or it could be a component of an electronic organizer type of device. The mobile station 100 could also be contained within a card or module that is connected during use to another device. For example, the mobile station 100 could be contained within a PCMCIA or similar type of card or module that is installed during use within a portable data processor, such as a laptop or notebook computer. In these cases it is assumed that a keypad of the host device is operated by the user to enter Hindi text into the mobile station 100, as will be described in detail below. The host computer could be one that is wearable by the user.

The mobile station 100 typically includes a data processor, typically embodied as a microcontrol unit (MCU)

120 having an output coupled to an input of a display 140 and an input coupled to an output of a keyboard or keypad 160.

The MCU 120 is assumed to include or be coupled to some type of a memory 130, including a read-only memory (ROM) for storing an operating program, as well as a random access memory (RAM) for temporarily storing required data, scratchpad memory, messages being composed and those that have been received, received packet data, packet data to be transmitted, and the like. A separate, removable SIM (not shown) can be provided as well, the SIM storing, for example, a preferred Public Land Mobile Network (PLMN) list and other subscriber-related information. The ROM is assumed, for the purposes of this invention, to store a software program enabling the MCU 120 to execute the software routines and protocols required to implement a user interface (UI), via display 140 and the numeric keypad 160, in accordance with this invention. Although not shown, a microphone and speaker are typically provided for enabling the user to conduct voice calls in a conventional manner.

The mobile station 100 also contains a wireless section that includes a digital signal processor (DSP) 180, or equivalent high speed processor or logic, as well as a wireless transceiver that includes a transmitter 210 and a receiver 220, both of which are coupled to an antenna 240 for communication with the network operator. At least one local oscillator (LO) 260, such as a frequency synthesizer, is provided for tuning the transceiver. Data, such as digitized voice and packet data, is transmitted and received through the antenna 240.

The user interface is the main focus of this invention, in particular a user interface that enables the user to enter and store Indian characters using only the numeric keypad 160, and to view the entered characters on the display 140. The entry of Indian characters enables the user to compose and to respond to messages, such as SMS and similar types of messages, including instant messaging applications, as well as to enter information when connected wirelessly to the internet and other data communications networks, including intranets. In the presently preferred embodiment of this invention the entered characters are Hindi characters. However, these teachings apply as well to other Indian languages, such as Punjabi, Gujarati, Oriya, Bengali, Assamese, Telugu, Kannada, Malayalam and Tamil. Other, non-Indian, languages may also benefit from the application of this invention The user interface includes a Hindi character editor function 130A that forms a part of the software (a stored program) in mobile station memory 130. As will be discussed in further detail below, the editor function 130A operates in conjunction with a set of rules 130B that the editor function 130A consults, for example when resolving the depression of a key that can be interpreted in more than one manner. A rendering or display engine 130C component is responsible for correctly forming images on the display 140 of the characters that make up the writing. Also referred to below is an editing or text buffer 130D wherein entered characters are stored.

It should be noted that the keypad 160 need not be a physical keypad with mechanical switches, but could be implemented as a touchscreen type of device and be displayed on a portion of the display 140. The keypad could also be located remotely and communicate with the MCU 120 through a low power RF or IR link. It should further be noted, as was mentioned above, that the keypad 160 (and/or the display 140) could be a component of a host device to which the mobile station 100 is attached or installed or inserted.

By way of introduction, Devanagari script is used to write Hindi. The Devanagari script has the following properties: (a) letters run left to right on a horizontal line, with space between each word; (b) there is no distinction between capital letters and lower case letters, as in Latin script; (c) there are both vowels and consonants; (d) the script is phonetic, meaning that it is pronounced as it is written, and syllabic, meaning that the writing is based on consonants and independent vowels that can form a syllable; and (e) characters can combine and change shape depending on their context.

The Unicode range for Devanagari letters is U+0900 to U+097F.

There are 33 consonants in the Devanagari script. Each consonant represents a single consonantal sound, but may also exhibit an inherent vowel (the short vowel/a/.) In the presence of the dependent vowel, the inherent vowel associated with a consonant is over-ridden by the dependent vowel. It should be noted that there are 45 Devanagari consonants defined in Unicode. The number 33 given here refers to Hindi-specific (non-nukta) consonants.

Vowels can be divided into independent and dependent vowels, also known as matras. The independent vowels may stand on their own, and are used to write syllables that start a word. An independent vowel may also appear within a word (e.g., see the example/bhai:/below.) Dependent vowels cannot stand alone, and are instead applied to a consonant or consonant cluster.

FIG. 2 shows the matras, or dependent vowels.

There are certain Devanagari specific characters that are now considered. The Devanagari script employs a sign, referred to as a halant (Unicode value U+094D), also known as virama and as a vowel omission sign. The character halant (virama) generally indicates the omission of vowel sound where it otherwise would occur. Normally, a halant is used at the end of the word to indicate that the word ends with a consonant sound (thus omitting the inherent vowel). The Indian standard ISCII extends the application of the halant: it is used to indicate the consonant clusters where two or more consonants are to be pronounced without any intervening vowel sound. Visually, such a phenomenon is usually depicted by changing the appearance of the vowel-less consonant, or by replacing a sequence of consonants by a single shape, a ligature. In systems with inadequate means of displaying the consonant clusters, a halant may be displayed as a visible character to indicate the omission of the vowel sound within the consonant cluster.

FIG. 3 shows the halant.

Modifiers indicate nasalization or aspiration. The modifiers are shown in FIGS. 4A, 4B and 4C, and are the candrabindu, inserted above the character (FIG. 4A), the anusvara, inserted above the character (FIG. 4B), and the visarga, inserted beside the character (FIG. 4C).

The Devanagari sign nukta, shown in FIG. 5, is a combining mark that is used with some characters to create new characters.

In accordance with an aspect of the teachings of this invention, the mobile station 100 is operated so as to enable the entry of Devanagari script to compose Hindi language messages. The entry of the Hindi characters is accomplished using the conventional numeric keypad 160, and thus does not require that the mobile station hardware be redesigned or modified in any way. Instead, the software of the mobile station 100 is modified so as to interpret the user input from the keypad 160 in the manner described below.

Figures 6, 7:
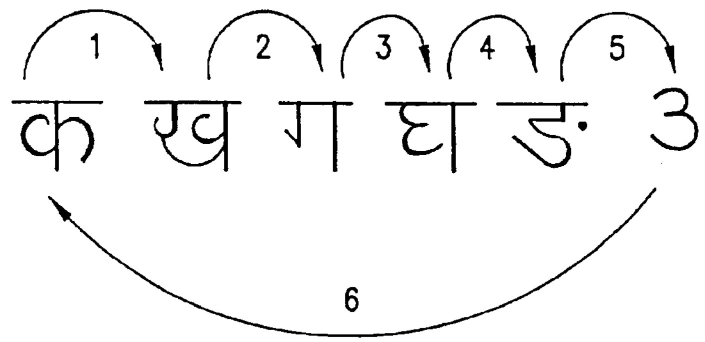
FIG. 6 shows a mapping of Hindi vowels and consonants relative to numeric keypad keys.
FIG. 7 illustrates how multiple key depressions are used to scroll through the Hindi characters that are mapped behind a specific key (the 3 key in this case)

Referring to FIG. 6, in accordance with one embodiment of this invention the Hindi vowels are mapped behind the keypad numeric keys 1 and 2, and the Hindi consonants are mapped behind keys 3–9. The consonants are arranged on the keypad 160 according to the vargs, with the non-varg consonants being distributed over keys 8 and 9. The last character on each key is the (Latin) number printed on the key (i.e., 1, 2, 3, 4, 5, 6, 7, 8, 9), which for convenience are used instead of the Hindi numbers.

In accordance with another embodiment of this invention the Hindi vowels are mapped behind the keypad numeric keys 2 and 3, the Hindi consonants are mapped behind keys 4–9, and the Devanagari modifiers are mapped behind key 1, including virama.

In other embodiments of this invention the vowels and consonants (as well as modifiers and the space key (0)) can be mapped on other keys. As such, these keys may be referred to hereafter simply as vowel keys, consonant keys, a modifier key and a space key, without specific reference to the actual key or keys that happen to be involved in the mapping.

Note that the vowel keys map both the independent and the dependent vowels. The choice of which is meant can be established automatically by the current editing context, in view of the current content of the editing buffer 130D at the current insertion point. Note in this regard that the current insertion point within the buffer 130D can be changed by changing the location of the cursor. As the insertion point in the buffer 130D is changed, then the current editing context may change as well.

The selection of a particular character for a given keypad numeric key is done by repeated key depressions, as is shown in FIG. 7 for the example of keypad numeric key 3. By pressing a key repeatedly within a timeout period the user is enabled scroll through the characters behind the key, which can be displayed in turn on the display 140 at the current character entry location or at some other predefined location. If the user pauses after a key depression for longer than the timeout period then the currently displayed character is entered into the text, and the cursor appears to the right of the current syllable. The timeout can be terminated by pressing another key.

Figure 8:
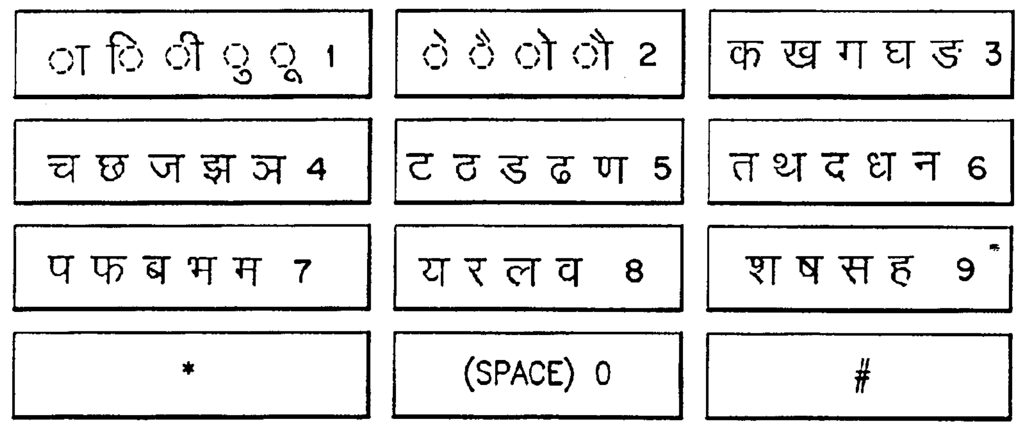
FIG. 8 shows the mapping of the Hindi keypad, and specifically the mapping of matras (dependent vowels) on keys 1 and 2, and consonants on keys 3–9 (the zero 0 key is used to enter whitespace)

FIG. 8 shows the keypad 160 mapping for matras (dependent vowels) on keys 1 and 2. The editor function 130A of the software in memory 130 interprets the vowel keys so as to always produce a matra when the current character insertion point (cursor location) follows a consonant (of the relevant script, e.g., a Hindi consonant).

As an example, to write /cha:pit/छापित, the user first presses key 4 twice for consonant /cha/छ, key 1 once for matra /–a:/◌ा, key 7 once for consonant /pa/प, key 1 twice for matra /–i/◌ि and finally key 6 once for consonant /ta/त.

Note that the matra /–i/ is entered only after the consonant /pa/ that it follows when pronounced. The rendering engine 130C function of the software in memory 130 displays the matra at the correct position on the display 140.

Figure 9:
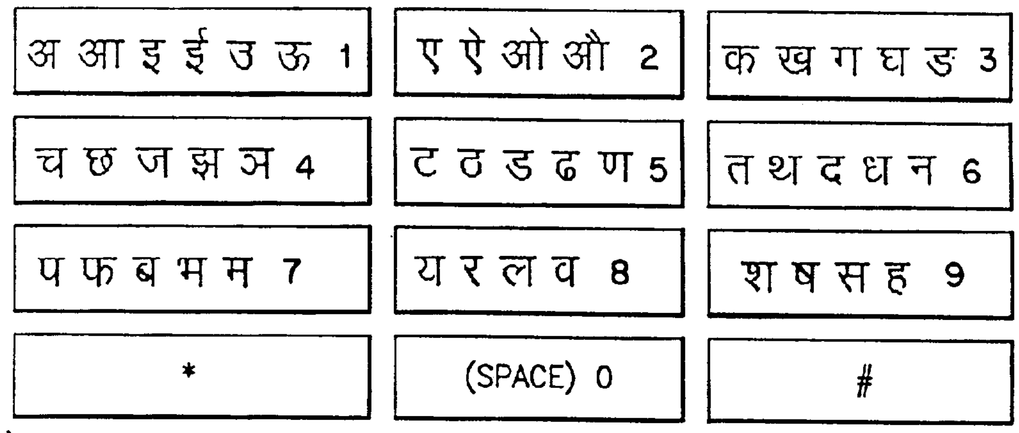
FIG. 9 shows the mapping of the Hindi keypad, and specifically the mapping of independent vowels on keys 1 and 2, and the consonants on keys 3–9.

FIG. 9 shows the keypad 160 mapping for independent vowels on keys 1 and 2. When the character preceding the insertion point is something other than a consonant, the editor function 130A of the software in memory 130 interprets keys 1–2 so as to produce an independent vowel.

As an example, to write /utha:u:/उठाऊ, the user first presses key 1 five times for vowel /u/उ, then key 5 twice for consonant /tha/ठ followed by one depression of key 1 for matra /–a:/◌ा, and finally key 1 is pressed six times for vowel /u:/ऊ.

Note that the single depression of key 1 after the consonant /tha/ produces matra /–a:/ instead of the independent vowel, because the editor function 130A intelligently assumes that a consonant is followed by a matra rather than an independent vowel. This type of decision making can be accomplished by storing the set of language and syntax rules 130B that the editor function 130A consults when resolving the depression of a key that can be interpreted in more than one manner, such as a key depression that is interpreted based on the context of the current insertion point in the text buffer 130D.

Note further in this regard that the depressions of key 1 after matra /–a:/ produces an independent vowel /u:/ instead of a matra, because a matra can only occur after a consonant.

If it is required to produce an independent vowel after a consonant, the user may press the context shift key (for example the * key (asterisk)) before entering the vowel by pressing one of vowel keys. For example, to write the word /bhai:/भई the user first presses key 7 four times for the consonant /bha/भ, then key * followed by key 1 four times for the independent vowel /i:/ई. If the user did not press the key * after entering the consonant /bha/ the editor 130A would instead produce the matra /–i:/◌ी resulting in /bhi:/भी.

Consonants inputted from the keys 3–9 are produced as full consonants. If the user needs to produce a consonant cluster (for example /p.ra/प्र instead of /para/पर, the user can change the previously entered consonant into a half-form by pressing the context shift key before entering the following consonant.

For example, to write /dilli:/दिल्ली, the user first presses key 6 three times for the consonant /da/द, then two times key 1 for matra /–i/◌ि, key 8 three times for consonant /la/ल followed by key * and three further depressions of key 8 to join another consonant /la/ into cluster /l.la/ल्ल. Finally, the user presses key 1 three times for the final matra /–i:/◌ी.

Note that if the user did not press key * between the first and second consonant /la/, the result would have been a sequence of full consonants /lala/लल instead of the desired consonant cluster /l.la/ल्ल.

The rendering engine 130C preferably automatically handles the ligatures such as /k.ssa/ and /t.ra/. For example, to write /ak.ss/अक्ष the user first presses key 1 once for /a/अ, then key 3 once for /ka/क. The user then presses the key * followed by key 9 twice for /ssa/ष. If the user did not press the key * between consonants /k.ssa/ and /k.ssa/ the consonants would not be joined as a cluster /k.ssa/क्ष, but they would appear instead as a sequence of full consonants (/kassa/कष).

Note that regardless of how the entered characters are displayed to the user, for example whether or not ligatures are correctly displayed, the content of the text buffer 130D will contain the correct character sequence. It is preferred, however, that for the case where the rendering engine 130C is able to substitute consonant clusters with appropriate ligatures, these are displayed as soon as the user has entered an appropriate character sequence.

The editor 130A, in cooperation with the stored list of rules 130B, also changes the consonant /ra/ into superscript repha when it occurs at the beginning of a consonant cluster.

As an example, to write /karta:/कर्ता the user first presses key 3 once for /ka/क, then key 8 twice for /ra/र, then the key * followed by one press of key 6 for the consonant cluster /r.ta/र्त instead of a sequence of fall consonants /rata/रत, and finally key 1 once for matra /a:/ा.

It should be noted that the ability or inability to display the consonant /ra/ in various contexts, such as the superscript repha that was discussed above, depends more specifically on the capabilities of the rendering engine 130C, and not the editor 130A.

Other Hindi characters can be entered as well using the editor 130A in accordance with the teachings of this invention.

For example, the modifiers (anusvara ं, carabindu ँ and visarga ः) as well as nukta ़, can be obtained through a Special Character Screen (SCS) 140A that is opened on the display 140 by a long depression of, for example, the context shift key. The SCS 140A, which can be considered as well to be a special characters window, includes a Special Characters List that contains at least the modifiers anusvara ं, carabindu ँ, visarga ः) and nukta ़.

As an example, to write /a:mkrha:/आँकड़ा, the user presses key 1 once for vowel /a:/आ, then user presses key * for a long period (at least about one second) to open the SCS 140A, then navigates the Special Character List to select the carabindu ँ from the list. The user then presses key 3 once for /ka/क. For the nukta consonant /rha/ड़ the user first presses key 5 three times for the consonant ड and then accesses the Special Character List 140A for nukta ़. Finally, user presses key 1 once for the matra /–a:/ा.

It should be noted that the last depression of key 1 produces the matra /–a:/, since the last entered character was a (nukta) consonant. The editor 130A, in cooperation with the rules 130B, combines the sequence of the consonant and the nukta into one single character.

The characters appearing in the Special Character List can be accessed by navigating the character list in four directions with number keys 2 (up), 4 (left), 6 (right) and 8 (down). The selected character is inserted into the text by pressing, for example, a left softkey (text "Use" or "Insert") which also closes the Special Character Screen 140A. If the user wishes to select more characters from the Special Character Screen 140A at one time, the user can insert a currently selected character into the text by pressing key 5. In this case the Special Character Screen 140A remains open, and the user can then continue by selecting another character from the Special Character Screen 140A.

It should be noted that it is within the scope of these teachings, and in fact may be preferred, to map the modifiers and other signs directly to one of the keys of the keypad 160. As an example, Devanagari modifiers and other signs can be directly mapped to key 1, the vowels can be mapped to keys 2 and 3, and the consonants can then be mapped to keys 4, 5, 6, 7, 8 and 9. Other mappings, key selections and arrangements can also be accomplished, which should become apparent to those skilled in the art when guided by these teachings.

Figures 10, 11:
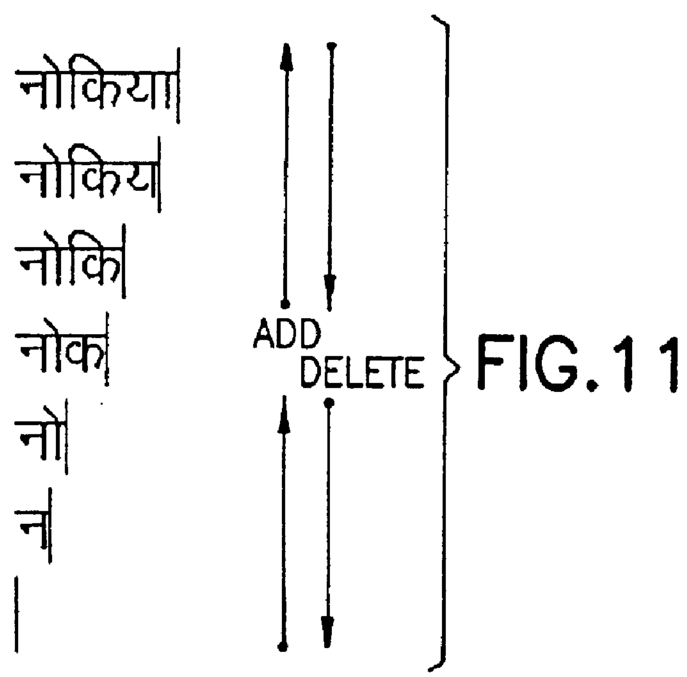
FIG. 10 shows an example of sample text, including the preferred use of Latin numbers as opposed to Devanagari script numbers, and allowable cursor stopping points between Hindi syllables.
FIG. 11 shows an example of the addition and the subsequent deletion of characters.

When the cursor is moved within the displayed text it stops only between Hindi syllables, as illustrated in FIG. 10. The thin vertical lines show the locations where the cursor can stop.

As the cursor is only allowed to stop between the Hindi syllables, it is not possible to place the cursor within a consonant cluster, or between a consonant and the independent vowel following it. In the example of FIG. 10 it can be seen that there are cursor stops indicated around the syllables व्य, लों, कि and ध्या, but not within them.

Referring to FIG. 11, the backwards deletion of the characters occurs in exactly the reverse order to entering the characters. While adding the matra of the short vowel /–i/ the editor 130A automatically places it at the left side of the consonant that it is attached to. As the deletion is performed in exactly reverse order, the matra deleted before the consonant.

It should again be noted that the encoding of the Hindi text happens in strictly logical order. For example, when the matra short /–i/ is added after a consonant, it is stored in the editing buffer 130D directly after the consonant. However, according to the rendering rules of the Devanagari script the matra short /–i/ visually appears at the left side of the entered consonant. This behavior is handled by the display engine 130C, which may also consult the set of rules 130B or a separate set of rendering or visualization rules, and can be essentially independent of the editing application performed by the editor function 130A.

It can be realized that the foregoing process of selecting and displaying Hindi characters normally includes buffering the selected characters (actually codes representing the selected characters) into the text buffer 130D in the memory 130, and then subsequently transmitting the buffered characters in a message or in a packet to the wireless network through the transmitter 210.

While described in the context of specific keys, specific character mappings and the like, it should be realized that these are exemplary of this invention and represent a presently preferred embodiment. However, in other embodiments of this invention other keys and character mappings could be used. As but one example, FIGS. 6, 8 and 9 show the vowels mapped on keys 1 and 2 in strict alphabetical order. However, in other embodiments other mappings could be used, such as by placing the long vowels on key 1 and the short vowels on key 2, or vice versa. The vowels can also be placed on other keys, such as keys 2 and 3, as was discussed above.

Thus, this invention is not intended to be limited to only the embodiments disclosed herein, but is to be given a wider scope of interpretation consistent with the appended claims.

What is claimed is:

1. A method for operating a device having a keypad comprised of a plurality of keys, for inputting characters from a set of characters used for constructing words in a predetermined language, comprising:

mapping a first subset of the set of characters to at least one predetermined key; wherein mapping said first subset of the set of characters to at least one predetermined key comprises mapping independent vowels to a first plurality of numeric keys;

mapping a second subset of the set of characters to the same one of said at least one predetermined key; wherein mapping said second subset of the set of characters to at least one predetermined key comprises mapping dependent vowels to the same first plurality of numeric keys;

mapping a third subset of the set of characters to at least one other key; and when activating said at least one predetermined key, automatically selecting for insertion into a character buffer a character from said first subset of the set of characters or from said second subset of the set of characters as a function of a content of the character buffer at a current insertion point into the character buffer;

where activating one of said first plurality of numeric keys selects one of an independent vowel or a dependent vowel depending on the character preceding the current character insertion point in the character buffer, wherein if the character preceding the current character insertion point is a consonant a dependent vowel is selected, otherwise an independent vowel is selected, wherein the dependent vowel is changed to an independent vowel by activating in sequence a context shift key and the key associated with a dependent vowel, whereby the independent vowel is selected without regard for the character that precedes the current insertion point in the character buffer.

2. A method as in claim 1, wherein mapping said third subset of the set of characters to at least one other numeric key comprises mapping consonants to a second plurality of numeric keys.

3. A method as in claim 2, and further comprising entering Hindi characters by activating a non-numeric key to open a special character window on a display, and selecting a desired Hindi character displayed in the special character window for input, where the special characters comprise anusvara, carabindu, visarga and nukta.

4. A method as in claim 2, where said first plurality of keys are numeric keys 2 and 3, and where said second plurality of keys are numeric keys 4, 5, 6, 7, 8 and 9.

5. A method as in claim 4, wherein modifiers anusvara, carabindu, visarga and nukta, and virama, are mapped to numeric key 1.

6. A method as in claim 2, where a consonant cluster is created by activating in sequence a context shift key and one of said second plurality of keys.

7. A method as in claim 2, wherein a nukta consonant is created by entering a consonant, followed by selecting a nukta modifier.

8. A method as in claim 7, wherein the nukta modifier is selected by depressing a predetermined key to which are mapped a plurality of modifiers, including the nukta modifier.

9. A method as in claim 1, wherein the predetermined language is based on one of a plurality of Indian scripts.

10. A method as in claim 1, wherein said device comprises a mobile station.

11. A method as in claim 1, wherein the predetermined language is Hindi.

12. A method as in claim 11, wherein said third subset of the set of characters comprise consonants.

13. A mobile station comprising a data processor coupled to a memory for executing a stored program and also coupled to a display and to a numeric keypad, said stored program comprising a Hindi character editor function responsive to activated keys on said numeric keypad for displaying and storing Hindi characters, where independent vowels are mapped to a first plurality of numeric keys, where dependent vowels are also mapped to said first plurality of numeric keys, and where consonants are mapped to a second plurality of numeric keys, said data processor being responsive to activating one of said first plurality of numeric keys for selecting and displaying one of an independent vowel or a dependent vowel depending on the character preceding a current character insertion point in an input character buffer, wherein if the character preceding the current character insertion point is a consonant a dependent vowel is selected, otherwise an independent vowel is selected; wherein the dependent vowel is changed to an independent vowel by activating in sequence a context shift key and the numeric key associated with a dependent vowel, whereby the independent vowel is selected without regard for the character that precedes the current insertion point.

14. A mobile station as in claim 13, where said first plurality of numeric keys wherein vowels are mapped comprise keys 2 and 3, where said second plurality of numeric keys wherein consonants are mapped comprise keys 4, 5, 6, 7, 8 and 9, where modifiers anusvara, carabindu, visarga and nukta are mapped to numeric key 1, where virama is also mapped to numeric key 1, and where said context switch key comprises *.

15. A mobile station as in claim 13, and further comprising entering Hindi characters by activating a non-numeric key to open a special character window on said display, and selecting a desired Hindi character displayed in the special character window for input.

16. A mobile station as in claim 15, where the special characters comprise anusvara, carabindu, visarga and nukta.

17. A mobile station as in claim 13, where said first plurality of numeric keys are 2 and 3, and where said second plurality of numeric keys are 4, 5, 6, 7, 8 and 9.

18. A mobile station as in claim 17, wherein modifiers anusvara, carabindu, visarga and nukta are mapped to numeric key 1.

19. A mobile station as in claim 13, wherein a nukta consonant is created by entering a consonant, followed by selecting a nukta modifier.

20. A mobile station as in claim 19, wherein the nukta modifier is selected by depressing a predetermined key to which are mapped a plurality of modifiers, including the nukta modifier.

21. A mobile station as in claim 13, where a consonant cluster is created by activating in sequence a context shift key and a consonant.

* * * * *